United States Patent Office 3,421,686
Patented Jan. 14, 1969

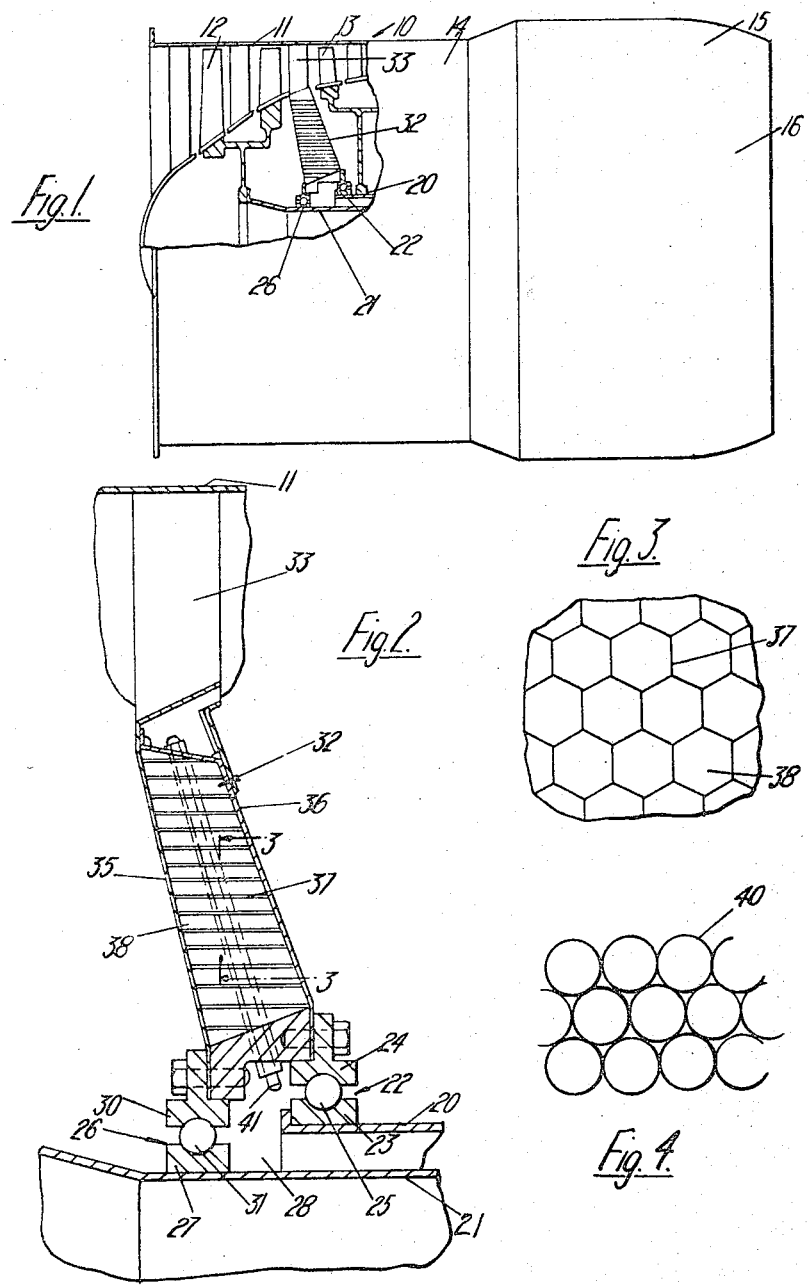

3,421,686
BEARING ASSEMBLY
John Frederick Coplin and Peter Longley, Derby, and Robert Vaughan Blackhurst, Ripley, England, assignors to Rolls-Royce Limited, Derby, England, a British company
Filed May 31, 1966, Ser. No. 553,860
Claims priority, application Great Britain, June 21, 1965, 26,206/65
U.S. Cl. 230—116   11 Claims
Int. Cl. F04d 25/02

ABSTRACT OF THE DISCLOSURE

A bearing assembly for a gas turbine engine or the like including a casing, at least one bearing within said casing, and at least one support member for supporting the bearing from the casing. The support member has at least a portion thereof which is hollow, the hollow portion having at least a part thereof internally divided by internal walls into a multiplicity of closely packed cells forming a cellular bracing structure.

---

This invention concerns a bearing assembly and, although it is not so restricted, it is more particularly concerned with a bearing assembly for a gas turbine engine.

According to the present invention, there is provided a bearing assembly comprising a casing, at least one bearing which is mounted therein, and at least one hollow member at least part of which is internally divided by internal walls into a multiplicity of closely packed cells the internal walls bounding each said cell being in contact with the internal walls bounding several other said cells, the thickness of the internal walls being substantially smaller than the width of the compartments bounded thereby, the said member supporting the bearing from the casing.

It will be appreciated that the said internal walls may be such as to impart considerable rigidity to the said member while permitting it to be made as light as possible.

The said internal walls are preferably constituted by the walls of a plurality of tubes all of which are parallel to the axis of the bearing assembly. Thus the or each said member may comprise two spaced apart walls with the said tubes disposed therebetween and secured thereto.

The said member may be an annular member.

Alternatively, the or each bearing may be supported from the casing by a plurality of said members which are constituted by angularly spaced apart struts.

There may be two bearings which are supported from the casing by common struts.

At least the said part of the said member may be of a light metal such as aluminium or titanium, but is preferably of synthetic resin material.

The or each bearing preferably comprises inner and outer races with rolling elements disposed therebetween and in rolling contact therewith, the outer race of the or each said bearing being supported from the casing by the said member or members.

There may extend through the or each said member a tube through which a fluid may be supplied to the bearing or bearings.

The invention also comprises a gas turbine engine provided with a bearing assembly as set forth above. Thus the said casing may be the outer casing of the engine, the or each said bearing having rotatably mounted therein a shaft carrying a compressor and a turbine of the engine.

The or each said bearing is preferably a front bearing of the engine.

The engine may be a vertical lift engine having a thrust to weight ratio of at least 8:1 and preferably of at least 12:1. Thus its thrust to weight ratio may be 16:1 or even more.

The term "vertical lift engine" as used in this specification is intended to indicate an engine adapted to produce vertical lift forces on an aircraft independently of those generated aerodynamically by forward flight of the aircraft.

The invention is illustrated, merely by way of example, in the accompanying drawings, in which:

FIGURE 1 is a diagrammatic view, partly in section, of a gas turbine vertical lift engine provided with a bearing assembly according to the present invention, FIGURE 2 is a broken-away sectional view on a larger scale of part of the structure shown in FIGURE 1, FIGURE 3 is a broken-away sectional view taken on the line 3—3 of FIGURE 2, and FIGURE 4 is a view similar to FIGURE 3 but showing a modification.

Referring to the drawings, a gas turbine vertical lift engine 10, having a thrust to weight ratio of at least 16:1, has an outer casing 11 in which there are disposed in flow series a two-stage low pressure compressor 12, a two-stage high pressure compressor 13, combustion equipment 14, a high pressure turbine 15, and a low pressure turbine 16.

The high pressure compressor 13 and high pressure turbine 15 are mounted on a common shaft 20. Mounted concentrically within the shaft 20 is a shaft 21 on which are mounted the low pressure compressor 12 and the low pressure turbine 16.

Opposite ends of the shaft 20 are respectively mounted in a rear bearing (not shown) and a front bearing 22. The front bearing 22 comprises an inner race 23 which is mounted on the shaft 20, an outer race 24, and balls 25 which are disposed between and in rolling contact with the races 23, 24.

Opposite ends of the shaft 21 are respectively mounted in another rear bearing (not shown) and in a front bearing 26. The front bearing 26 comprises an inner race 27 which is mounted on the shaft 21, an outer race 30, and balls 31 which are disposed between and in rolling contact with the races 27, 30. The bearings 22, 26 are spaced by an annular space 28.

The outer races 24, 30 are supported from the outer casing 11 by way of a plurality of angularly spaced apart struts 32. Each strut 32 has a radially outer portion 33 of aerofoil shape which extends across the main annular flow duct of the engine, and a radially inner portion which is made up of two axially spaced apart walls 35, 36 between which is disposed and to which are adhered a multiplicity of hexagon section tubes 37 all of which are parallel to the engine axis and whose walls divide the said radially inner portion internally into a multiplicity of similarly shaped compartments 38.

The tubes 37 are formed of synthetic resin material such, for example, as an epoxy resin, while the walls 35, 36, which are bonded to this synthetic resin material, may be made up of laminated sheets of the same or a different resin. These laminated sheets provide the struts 32 with radial rigidity. As will be appreciated, the provision of the struts 32 with the tubes 37 both reduces cost and weight while maintaining considerable strength.

The tubes 37 may be filled with wax prior to machining them to shape, the wax being melted out after the machining has been completed.

The tubes 37 may be replaced by a multicellular or honeycomb structure (not shown), e.g. of synthetic resin material, or by cylindrical tubes 40 as shown in FIGURE 4.

Extending from the roots of two or three of the radially outer portions 33 down to the space 28 are tubes 41 (of metal or synthetic resin) through which a fluid such as cooling air or oil may be supplied to the bearings 22, 26.

The provision of tubes 37, 40 extending parallel to the engine axis provides the axial strength necessary to carry considerable axial loads.

If desired, the struts 32 could be constituted by the portions 33 only and could be bonded to an annular member (not shown) which carries the bearingsg 22, 26 and which is provided internally with tubes such as the tubes 37, 40.

We claim:

1. A bearing assembly comprising: a casing; at least one bearing within said casing; and at least one support member for supporting said bearing from said casing, said support member having at least a portion thereof which is hollow, said hollow portion having at least a part thereof internally divided by internal walls defining a plurality of closely packed cells, the internal walls bounding each of said cells being in contact with the internal walls bounding several other of said cells, said internal walls bounding each of said cells having a thickness substantially smaller than the width of the cell bounded thereby.

2. A bearing assembly as claimed in claim 1 in which the said internal walls are constituted by the walls of a plurality of tubes all of which are parallel to the axis of the bearing assembly.

3. A bearing assembly as claimed in claim 2 in which the said support member comprises two spaced apart walls with the said tubes disposed therebetween and secured thereto.

4. A bearing assembly as claimed in claim 1 in which the said support member is an annular member.

5. A bearing assembly as claimed in claim 1 in which the bearing is supported from the casing by a plurality of said support members which are constituted by angularly spaced apart struts.

6. A bearing assembly as claimed in claim 5 in which there are two bearings which are supported from the casing by common struts.

7. A bearing assembly as claimed in claim 1 in which at least the said part of said support member is formed of synthetic resin material.

8. A bearing assembly as claimed in claim 1 in which the bearing comprises inner and outer races with rolling elements disposed therebetween and in rolling contact therewith, the outer race of the said bearing being supported from the casing by the said support member.

9. A bearing assembly as claimed in claim 1 in which there extends through the said support member a tube through which a fluid may be supplied to the bearing.

10. A gas turbine engine comprising: a casing; a compressor and a turbine in flow series within said casing; a rotatable shaft for carrying said compressor and said turbine; and a bearing assembly for rotatably supporting said shaft; said bearing assembly comprising at least one bearing within said casing, at least one support member for operatively supporting said bearing from said casing; said support member having at least a portion thereof which is hollow, said hollow portion having at least a part thereof internally divided by internal walls defining a plurality of closely packed cells, the internal walls bounding each of said cells being in contact with the internal walls bounding several other of said cells, said internal walls bounding each of said cells having a thickness substantially smaller than the width of the cell bounded thereby.

11. A gas turbine engine as claimed in claim 10 in which the said bearing is a front bearing of the engine.

References Cited

UNITED STATES PATENTS

| 2,270,141 | 1/1942 | Potter | 308—15 X |
|---|---|---|---|
| 2,540,968 | 2/1951 | Thomas | 308—15 |
| 2,724,621 | 11/1955 | Kenney | 308—22 X |
| 2,743,751 | 5/1956 | Klod | 308—22 X |
| 2,928,648 | 3/1960 | Haines et al. | 308—15 X |
| 2,960,827 | 11/1960 | Newcomb | 308—15 X |

OTHER REFERENCES

Honeycomb Sandwich Structures, Materials in Design Engineering, vol. 62, No. 5, October 1965, pp. 444–445.

MARTIN P. SCHWADRON, *Primary Examiner.*

FRANK SUSKO, *Assistant Examiner.*

U.S. Cl. X.R.

308—15